United States Patent
Jiang et al.

(10) Patent No.: US 11,174,531 B2
(45) Date of Patent: Nov. 16, 2021

(54) LOCAL HEAT TREATMENT METHOD FOR CONTROLLING RESIDUAL STRESS WITH PRIMARY AND AUXILIARY HEATING

(71) Applicant: CHINA UNIVERSITY OF PETROLEUM(EAST CHINA), Qingdao (CN)

(72) Inventors: Wenchun Jiang, Qingdao (CN); Qiang Jin, Qingdao (CN); Wenbin Gu, Qingdao (CN); Xiancheng Zhang, Qingdao (CN); Shandong Tu, Qingdao (CN)

(73) Assignee: CHINA UNIVERSITY OF PETROLEUM(EAST CHINA), Qingdao (CN)

( * ) Notice: Subject to any disclaimer, the term of this patent is extended or adjusted under 35 U.S.C. 154(b) by 0 days.

(21) Appl. No.: 17/291,489

(22) PCT Filed: May 25, 2020

(86) PCT No.: PCT/CN2020/092028
§ 371 (c)(1),
(2) Date: May 5, 2021

(65) Prior Publication Data
US 2021/0324494 A1  Oct. 21, 2021

(30) Foreign Application Priority Data
Mar. 20, 2020 (CN) .......................... 202010198508.2

(51) Int. Cl.
*C21D 11/00* (2006.01)
*C21D 1/42* (2006.01)
*C21D 9/50* (2006.01)

(52) U.S. Cl.
CPC ............... *C21D 11/00* (2013.01); *C21D 1/42* (2013.01); *C21D 9/50* (2013.01); *C21D 2221/00* (2013.01)

(58) Field of Classification Search
CPC . C21D 11/00; C21D 1/42; C21D 9/50; C21D 2221/00
See application file for complete search history.

(56) References Cited

FOREIGN PATENT DOCUMENTS

SU       1632709 A1 *  3/1991

OTHER PUBLICATIONS

First Office Action issued in corresponding Chinese Application No. 202010198508.2; dated Dec. 22, 2020; State Intellectual Property Office of the P.R. China, Beijing, China, 8 pgs.
(Continued)

*Primary Examiner* — Rebecca Janssen
(74) *Attorney, Agent, or Firm* — Hauptman Ham, LLP

(57) ABSTRACT

A primary heating band is applied to a weld to control a microstructure and hardness of the weld and uniformity of the structure to realize micro-control of the residual stress; an auxiliary heating band is applied a certain distance away from the weld to generate compressive stress on an inner surface of the weld to realize macro-control of the compressive stress. Reinforcement with a rib plate is eliminated, and a labor intensity and a construction period are reduced. The method reduces deformation near the weld and transfers the largest deformation to a non-weld zone; by applying the auxiliary heating and strictly controlling a time interval between primary heating and auxiliary heating, the structure is improved and the welding residual stress is controlled at the same time; a local heat treatment effect is optimized, and a small tensile stress or compressive stress is generated on the inner surface of the weld.

9 Claims, 2 Drawing Sheets

(56) References Cited

OTHER PUBLICATIONS

First Search Report issued in corresponding Chinese Application No. 202010198508.2; dated Dec. 15, 2020 State Intellectual Property Office of the P.R. China, Beijing, China, 5 pgs.
Grant Notice issued in corresponding Chinese Application No. 202010198508.2; dated Jan. 29, 2021; State Intellectual Property Office of the P.R China, Beijing, China, 3 pgs.
International Search Report issued in corresponding International Application No. PCT/CN2020/092028; dated Dec. 28, 2020; State Intellectual Property Office of the P.R. China, Beijing, China, 9 pgs.
Written Opinion issued in corresponding International Application No. PCT/CN2020/092028; dated Dec. 28, 2020; State Intellectual Property Office of the P.R. China, Beijing, China, 7 pgs.

\* cited by examiner

LOCAL HEAT TREATMENT METHOD FOR CONTROLLING RESIDUAL STRESS WITH PRIMARY AND AUXILIARY HEATING

RELATED APPLICATIONS

The present application is a U.S. National Phase of International Application Number PCT/CN2020/092028, filed May 25, 2020, and claims the priority of Chinese Application No. 202010198508.2, filed Mar. 20, 2020.

TECHNICAL FIELD

The present disclosure relates to the technical field of heat treatment, and in particular to a local heat treatment method for controlling residual stress with primary and auxiliary heating.

BACKGROUND

Heat treatment, as an important technology of manufacture and safety of major equipment, becomes a major problem. In the fields such as petrochemical industry and nuclear power, pressure vessels as key core equipment are major places for realizing heat and mass transfer chemical reactions, and therefore, their in-service safety is of great significance. At present, pressure vessels in China are continuously developing toward large diameter, ultra-thick wall and ultra-length, breaking world records in size continuously. However, the problem of stress corrosion cracking (SCC) of welding joints has become a major reason for failure of petrochemical and nuclear power equipment.

Due to limited volume of heat treatment furnaces, a large-size pressure vessel cannot go through entire heat treatment but local heat treatment. Although the heat treatment can effectively eliminate welding residual stress, cracks may be produced for the adverse hazards of heat treatment are ignored in relevant standards and regulations. Such a problem has not been scientifically solved in design standards at home and abroad. For local heat treatment, GB150 stipulates that entire circumference including a nozzle is heated. This stipulation is feasible for small-size vessels, but is obviously unfeasible for vessels with ultra-large diameter of, for example, 50 m. From the viewpoint of costs, a large amount of electric power is to be consumed. From the viewpoint of vessel integrity, the vessel heat treatment easily causes large deformation. Spot heating is allowable in ASME, but verification must be performed based on numerical simulation.

At present, a rigid-flexible synergic control method of segmented symmetrical heating and rib plate reinforcement is adopted in China, which improves the residual stress elimination effect from 30% to 70% or higher. Therefore, the problem that ultra-large pressure-bearing equipment cracks due to excessive deformation is solved. However, in an actual on-site operation, a huge amount of work including rib plate cutting, welding and removing prolongs construction period. Due to existence of the rib plate, heat holding tooling needs to be re-designed, and it is more difficult to control temperature in heat treatment. By testing the stress of a closure weld of the largest tower in the world before and after local heat treatment, it is found that the stress changes little before and after traditional local heat treatment, which further proves the problem of the existing heat treatment. Thus, heat treatment has become an urgent problem to be solved in major national projects such as nuclear power and petrochemical. In addition, in the field such as bridges, shipbuilding and heavy machinery where flat plate structures are widely applied, local heat treatment is also a key technology.

In conclusion, with further deterioration of the petrochemical service environment, nuclear power is designed to serve for 60 years, which has extremely high requirements for reliability and thus brings a great challenge to welding manufacturing. Therefore, elimination of welding residual stress becomes a key factor for improving service life. The existing main contradictions are as follows: firstly, the microstructure of the welding joint is non-uniform with micro-defects such as element segregation or metal compounds (such as carbide and 6 phase) therein, resulting in microscopic stress concentration providing a driving force for inter-granular stress corrosion cracks; secondly, it is difficult for local heat treatment to eliminate welding residual stress, and much more difficult to produce compressive stress at the inner surface of the welding joint. Therefore, the problem of stress corrosion cracking of the welding joint cannot be solved. In this case, it is necessary to develop a manufacturing technology based on residual stress control to eliminate micro and macro residual stresses, realize uniformity of the structure, and generate the compressive stress on the inner surface of the welding joint at the same time, that is, to perform micro-structure control and macro compressive residual stress control, so as to solve the problem of stress corrosion cracking.

SUMMARY

Based on the above background art, an example of the present disclosure provides a brand-new local heat treatment method, and specifically a local heat treatment method for controlling residual stress with primary and auxiliary heating. The local heat treatment method includes: applying a primary heating band to a weld to control microstructure and hardness of the weld so as to uniformize the structure, realizing micro-control of the residual stress; and applying an auxiliary heating band a certain distance away from the weld to generate compressive stress on an inner surface of the weld so as to realize macro-control of the compressive stress.

The present disclosure adopts the following technical solution.

A local heat treatment method for controlling residual stress with primary and auxiliary heating includes: applying a primary heating band to a weld, and applying an auxiliary heating band a certain distance away from the primary heating band.

Further, the primary heating band is applied to the weld to control the microstructure and hardness of the weld so as to uniformize the structure, realizing the micro-control of the residual stress; the auxiliary heating band is applied a certain distance away from the weld to generate compressive stress on the inner surface of the weld so as to realize the macro-control of the compressive stress.

The method includes the following steps.

I. Determination of a Heat Treatment Process of the Primary Heating Band

At step 1, the heat treatment process of the primary heating band is preliminarily determined.

Key process parameters of heat treatment are determined according to a heat treatment object in combination with respective inherent features and corresponding local heat treatment purposes as well as technical design documents and relevant standards and regulations. The key process parameters include a temperature increase and decrease rate, a holding temperature, a holding time, and a width ($W_{PHB}$) of the heating band.

Further, the heat treatment object is a large-size reinforcement plate weld, a pipe circumferential weld, a cylinder closure weld, or a flat plate structure on a pressure vessel.

Further, a diameter of an opening on the pressure vessel of the reinforcement plate is greater than or equal to 4 m.

Further, the reinforcement plate is a circular reinforcement plate or a square reinforcement plate. For the circular reinforcement plate, six-segment three-stage symmetrical heat treatment is adopted; for the square reinforcement plate, four-segment two-stage symmetrical heat treatment is adopted.

Further, when a radius-thickness ratio of the closure weld is greater than 500, segmented symmetrical heat treatment is adopted as follows: a whole circumference is divided into several symmetrical segments for performing the symmetrical heat treatment.

Generally, openings are opened on the pressure vessel to weld nozzles of different functions according to functional requirements, but the openings weaken the local strength of the vessel. In engineering, the problem of insufficient strength is solved by reinforcement, for example, by a reinforcement plate. For an ultra-large pressure vessel, its maximum opening diameter may reach as large as 8-10 m, which requires large-size and thick-wall reinforcement plates. According to shape, the reinforcement plate may include two types of reinforcement plates: a circular reinforcement plate and a square reinforcement plate. "Bull's eye" type heating is generally adopted for the above two types of large reinforcement plates and a cylinder closure weld. A weld of the reinforcement plate along an axial direction is a part that deforms most in heat treatment, and therefore this part is a dangerous position easily cracking. To mitigate unharmonious deformation in the axial direction during heat treatment, segmented heat treatment is adopted. For the "circular" reinforcement plate, six-segment three-stage symmetrical heat treatment is adopted; for the "square" reinforcement plate, four-segment two-stage symmetrical heat treatment is adopted.

For the pipe circumferential weld, primary heat treatment of whole circle is generally adopted. For the cylinder closure weld of the pressure vessel, the primary heat treatment of whole circle may be selected based on wall thickness and diameter. For the closure weld with a large thickness, it is recommended to adopt segmented symmetrical heat treatment, which specifically includes performing symmetrical heat treatment by dividing a whole circumference into several symmetrical segments.

At step 2, the heat treatment process of the primary heating band is optimized.

Whether a width of a uniform temperature band and temperature uniformity along a thickness direction satisfy requirements is determined based on numerical simulation calculation, and verification is performed through a heat treatment simulation test based on the determination to optimize the key process parameters of the primary heating band.

Further, when the primary heating band adopts induction heating, determination of arrangement of an induction cable based on numerical simulation is further included in step 2.

During optimization of the heat treatment process of the primary heating band, the width of the uniform temperature band and the temperature uniformity along the thickness direction are key factors affecting the elimination effect of heat treatment and improvement of the structure. Therefore, whether the width of the uniform temperature band and the temperature uniformity along the thickness direction satisfy requirements is firstly determined based on numerical simulation calculation, and then, verification is performed through the heat treatment simulation test based on the determination to further perform optimization. At present, there are generally several local heat treatment methods as follows: a crawler-type ceramic heating sheet or a heat treatment rope or induction heating is adopted. The crawler-type ceramic heating sheet has the following features: heating is performed by resistance external heating and heat radiation, which features heating efficiency of no more than 60%, low automation degree, short service life, large maintenance work, and high power consumption. The induction heating has the following features: heating is realized by local internal heating and heat transfer, which features heating efficiency of no less than 90%, high automation degree, service life of more than 5 years, no maintenance, green and clean environmental friendliness and accurate temperature control. According to the actual site circumstances, double-side heating, or single-side heating and single-side temperature holding is adopted for heat treatment. If the induction heating is adopted, the arrangement of the induction cable needs to be determined based on numerical simulation with the purpose of realizing temperature uniformity better.

II. Determination of a Heat Treatment Process of the Auxiliary Heating Band

Heat treatment process parameters of the auxiliary heating band include a distance ($W_{DCB}$) of a central position of the auxiliary heating band from the primary heating band, a highest temperature ($T_A$) of the auxiliary heating band and a width ($W_{AHB}$) of the auxiliary heating band.

At step 3, the distance ($W_{DCB}$) of the central position of the auxiliary heating band from the primary heating band is determined.

A finite element model is built to perform welding and heat treatment simulation based on a heat treatment process curve and the key process parameters determined at step 2, and a change result of axial stress (rotary structure) or transverse stress (flat plate structure) during a heat treatment temperature holding process is checked to determine a middle position $W_{DCB}$ where compressive stress is generated, and the middle position $W_{DCB}$ where compressive stress is generated is away from the center of the weld in the following distance: $W_{PHB}<W_{DCB}<2W_{PHB}$, so that the distance $W_{DCB}$ of the central position of the auxiliary heating band from the primary heating band is obtained.

In the above technical solution, welding and heat treatment simulation is performed by building the finite element model based on the heat treatment process curve and the key process parameters determined at step 2, and the effects of eliminating the residual stress before and after heat treatment are checked to optimize the heat treatment process parameters. After the optimized heat treatment process parameters are obtained, the change result of the axial stress (rotary structure) or the transverse stress (flat plate structure) during heat treatment, especially in a temperature holding process is checked to determine the middle position where the compressive stress is generated. For local heat treatments of reinforcement plate weld and closure weld and the like, the distance of the region in which the compressive stress is generated from the center of the weld is $W_{PHB}<W_{DCB}<2W_{PHB}$.

At step 4, the highest temperature ($T_A$) of the auxiliary heating band is determined.

Firstly, it is assumed that the width of the auxiliary heating band is the width of the primary heating band at the central position $W_{DCB}$ of the auxiliary heating band determined at step 3, and then stress distributions after heat treatment at different holding temperatures are compared to determine the highest temperature $T_A$ of the auxiliary heating band.

Further, the highest temperature of the auxiliary heating band is 40-60% of the heat treatment holding temperature of the primary heating band.

At step 5, the width ($W_{AHB}$) of the auxiliary heating band is determined.

The width of the auxiliary heating band is changed based on step 4 to determine the optimal width of the auxiliary heating band. The width $W_{AHB}$ of the auxiliary heating band is $0.5W_{PHB} < W_{AHB} < W_{PHB}$.

In the above technical solution, the width of the auxiliary heating band is changed based on step 4 to determine the optimal width of the auxiliary heating band. Generally, the width of the auxiliary heating band is $0.5W_{PHB} < W_{AHB} < W_{PHB}$.

Thus, the determination of the optimal heat treatment process of the auxiliary heating band is completed.

III. Optimization of Local Heat Treatment Processes of Primary and Auxiliary Heating At step 6, the residual stress is controlled by the primary and auxiliary heating bands.

After the heat treatment processes of the primary and auxiliary heating bands are obtained, the impact of the temperature increase time of the auxiliary heating band is studied based on numerical simulation to determine a temperature increasing time of the auxiliary heating band, where the temperature of the auxiliary heating band increases after the temperature of the primary heating band increases.

In the above technical solution, after the preferred heat treatment processes of the primary and auxiliary heating bands are obtained, the impact of the temperature increasing time of the auxiliary heating band is studied based on numerical simulation to determine the optimal heat treatment process. The temperature increase time mainly includes the following: the temperatures of the primary and auxiliary heating bands increase simultaneously, and the auxiliary heating band increases temperature later than the primary heating. It is found through study that a better effect is achieved when auxiliary heating band increases temperature later than the primary heating band.

The specific local heat treatment method includes the following: firstly the primary heating band at the weld is heated to the holding temperature, the auxiliary heating band is heated when the primary heating band starts to cool down, and the auxiliary heating band starts to cool down when the primary heating band is cooled down to 100-150° C.

Further, the implementation of heat treatment is included, which is detailed as below.

IV. Implementation of Heat Treatment

At step 7, the heat treatment is implemented.

According to the determined heat treatment solution, thermocouple spot welding, and laying of heating sheets and temperature holding tooling are carried out, and a temperature measuring thermocouple, a temperature control thermocouple, and a compensation thermocouple are wire-connected with a paperless recorder and a temperature control cabin to ensure thermocouples and heat treatment-related devices are fault-free and then heat treatment is carried out.

The present disclosure has the following beneficial effects.

The local heat treatment method for controlling residual stress with primary and auxiliary heating adopted by the present disclosure is a brand-new local heat treatment method which eliminates reinforcement of rib plates and is easy to operate, greatly reducing the labor intensity and the construction period.

In the local heat treatment method for controlling residual stress with primary and auxiliary heating adopted by the present disclosure, the auxiliary heating is applied to the non-weld zone and has a low heating temperature. Therefore, compared with the traditional heat treatment method, the method of the present disclosure greatly reduces deformation near the weld and transfers the largest deformation to the non-weld zone.

The local heat treatment method for controlling residual stress with primary and auxiliary heating adopted herein may improve the structure and significantly control the welding residual stress by applying the auxiliary heating and strictly controlling a time interval between the primary heating and the auxiliary heating.

By adopting the local heat treatment method of the present disclosure, the local heat treatment effect is optimized so that a small tensile stress or even the compressive stress is generated on the inner surface of the weld, thereby fundamentally solving the problem of leakage caused by stress corrosion cracking generated at the weld of large-size equipment.

DETAILED DESCRIPTION OF THE EMBODIMENTS

Figure 1:
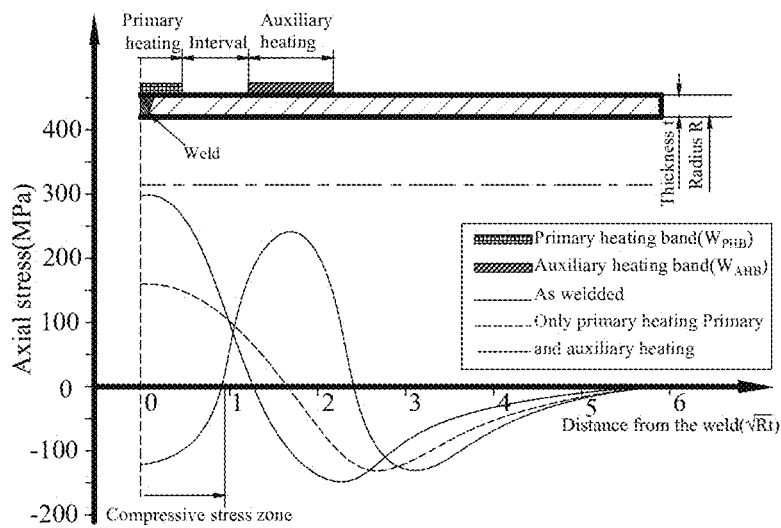
FIG. 1 is a principle diagram of primary and auxiliary heating according to an example of the present disclosure.

The present disclosure is described in detail below in combination with specific examples.

A local heat treatment method for controlling residual stress with primary and auxiliary heating includes: applying a primary heating band to a weld, and applying an auxiliary heating band a certain distance away from the primary heating band.

The method includes the following steps.

I. Determination of a Heat Treatment Process of the Primary Heating Band

At step 1, the heat treatment process of the primary heating band is preliminarily determined.

Key process parameters of heat treatment are determined according to a heat treatment object in combination with respective inherent features and corresponding local heat treatment purposes as well as technical design documents and relevant standards and regulations. The key process parameters include a temperature increase and decrease rate, a holding temperature, a holding time, and a width ($W_{PHB}$) of the heating band.

At step 2, the heat treatment process of the primary heating band is optimized.

Whether a width of a uniform temperature band and temperature uniformity along a thickness direction satisfy requirements is determined based on numerical simulation calculation, and verification is performed through a heat treatment simulation test based on the determination to optimize the key process parameters of the primary heating band.

II. Determination of a Heat Treatment Process of the Auxiliary Heating Band

Heat treatment process parameters of the auxiliary heating band include a distance $W_{DCB}$ of a central position of the auxiliary heating band from the primary heating band, a highest temperature $T_A$ of the auxiliary heating band and a width $W_{AHB}$ of the auxiliary heating band.

At step 3, the distance $W_{DCB}$ of the central position of the auxiliary heating band from the primary heating band is determined.

A finite element model is built to perform welding and heat treatment simulation based on a heat treatment process curve and the key process parameters determined at step 2, and a change result of axial stress (rotary structure) or transverse stress (flat plate structure) during a heat treatment temperature holding process is checked to determine a middle position $W_{DCB}$ where compressive stress is generated, and the middle position $W_{DCB}$ where compressive stress is generated is away from the center of the weld in the following distance: $W_{PHB}<W_{DCB}<2W_{PHB}$, so that the distance $W_{DCB}$ of the central position of the auxiliary heating band from the primary heating band is obtained.

At step 4, the highest temperature $T_A$ of the auxiliary heating band is determined.

Firstly, it is assumed that the width of the auxiliary heating band is the width of the primary heating band at the central position $W_{DCB}$ of the auxiliary heating band determined at step 3, and then stress distributions after heat treatment at different holding temperatures are compared to determine the highest temperature of the auxiliary heating band.

At step 5, the width $W_{AHB}$ of the auxiliary heating band is determined.

The width of the auxiliary heating band is changed based on step 4 to determine the optimal width of the auxiliary heating band. The width $W_{AHB}$ of the auxiliary heating band is $0.5W_{PHB}<W_{AHB}<W_{PHB}$.

III. Optimization of Local Heat Treatment Processes of Primary Heating and Auxiliary Heating At step 6, the residual stress is controlled by the primary and auxiliary heating bands.

After the heat treatment processes of the primary and auxiliary heating bands are obtained, the impact of the temperature increase time of the auxiliary heating band is studied based on numerical simulation to determine a temperature increasing time of the auxiliary heating band, where the temperature of the auxiliary heating band increases after the temperature of the primary heating band increases.

The specific local heat treatment method includes the following: firstly the primary heating band at the weld is heated to the holding temperature, the auxiliary heating band is heated when the primary heating band starts to cool down, and the auxiliary heating band starts to cool down when the primary heating band is cooled down to 100-150° C.

IV. Implementation of Heat Treatment

At step 7, the heat treatment is implemented.

According to the determined heat treatment solution, thermocouple spot welding, and laying of heating sheets and temperature holding tooling are carried out, and a temperature measuring thermocouple, a temperature control thermocouple, and a compensation thermocouple are wire-connected with a paperless recorder and a temperature control cabin to ensure thermocouples and heat treatment-related devices are fault-free and then heat treatment is carried out.

Further, in an example of the present disclosure, the heat treatment object is a large-size reinforcement plate weld, a pipe circumferential weld, a cylinder closure weld, or a flat plate structure on a pressure vessel.

Further, in an example of the present disclosure, a diameter of an opening on the pressure vessel of the reinforcement plate is greater than or equal to 4 m.

Further, in an example of the present disclosure, the reinforcement plate is a circular reinforcement plate or a square reinforcement plate. For the circular reinforcement plate, six-segment three-stage symmetrical heat treatment is adopted; for the square reinforcement plate, four-segment two-stage symmetrical heat treatment is adopted.

Further, in an example of the present disclosure, when a radius-thickness ratio of the closure weld is greater than 500, segmented symmetrical heat treatment is adopted: a whole circumference is divided into several symmetrical segments to perform the symmetrical heat treatment.

Further, in an example of the present disclosure, when the primary heating band adopts induction heating, determination of arrangement of an induction cable based on numerical simulation is further included in step 2.

Further, in an example of the present disclosure, the highest temperature of the auxiliary heating band is 40-60% of the heat treatment holding temperature of the primary heating band in step 4.

Example 1

Figure 2:
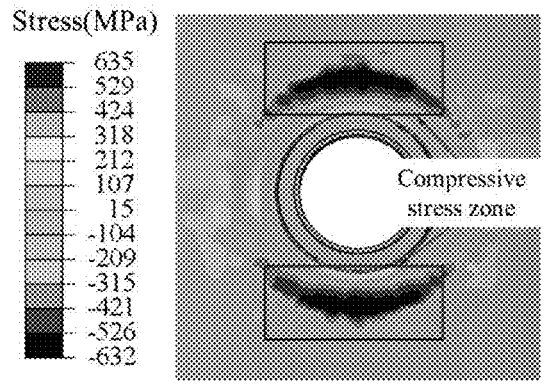
FIG. 2 is a cloud chart of compressive stress generated by a circular reinforcement plate during temperature holding process according to a first example of the present disclosure.
Figure 3:
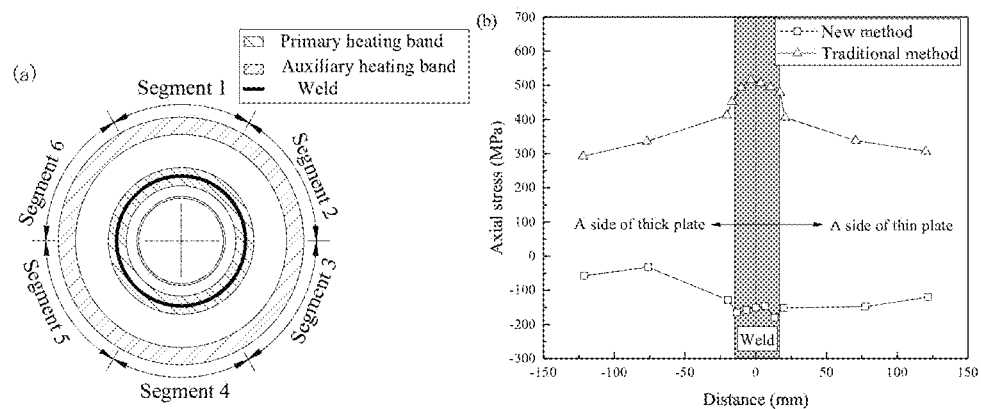
FIG. 3 is a diagram of segmented arrangement of primary and auxiliary heating along a circular reinforcement plate and a curve chart of axial stress of an inner lower path according to a first example of the present disclosure.

As shown in FIGS. 1-3, an ultra-large pressure vessel cylinder is 50 mm in thickness and 40 m in diameter. The reinforcement plate is a "circular" reinforcement plate which is 120 mm in thickness and about 4.2 m in diameter. The width of the primary heating band is 600 mm, a spacing between the primary heating band and the auxiliary heating band is 400 mm, the width of the auxiliary heating band is 400 mm, and the highest temperature of auxiliary heating is 500° C. Numerical simulation is performed according to a heat treatment condition and relevant input. A cloud chart of the stress after temperature increase is obtained by only a primary heating method, i.e. "bull's eye" type heating, as shown in FIG. 2. It may be seen from FIG. 2 that a large compressive stress is generated above and below the reinforcement plate, which is about 600 mm away from the weld. Based on this, the local heat treatment method by the synergy of primary heating and auxiliary heating is performed. FIG. 3(a) is a diagram of segments and arrangement of primary and auxiliary heating. FIG. 3(b) is a path distribution diagram of axial stress of a lower path on an inner surface of the reinforcement plate after the method is adopted. It may be seen from FIG. 3(b) that by adopting the method, an obvious heat treatment effect is achieved and the compressive stress is generated on the inner surface.

Example 2

Figure 4:
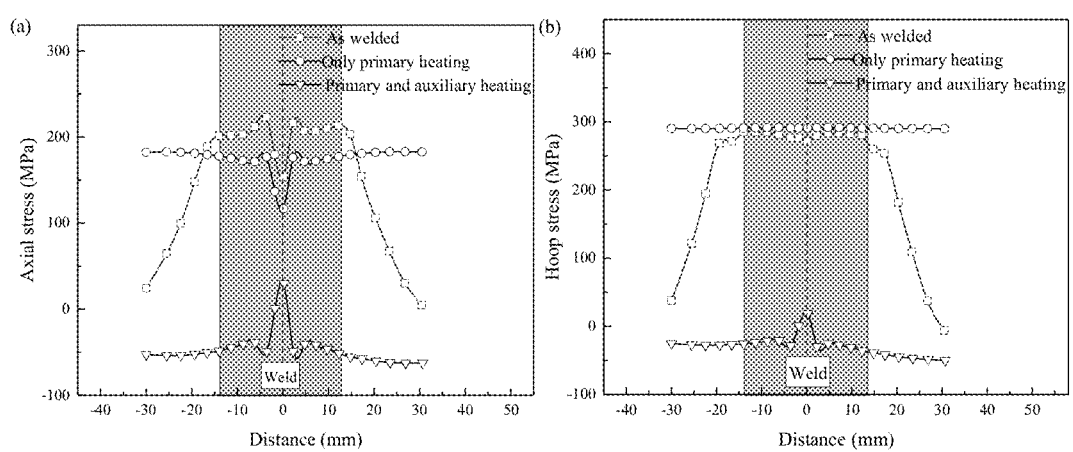
FIG. 4 is curve chart of axial stress and circumferential stress of a vertical cylinder closure weld according to a second example of the present disclosure.

As shown in FIG. 1, an axisymmetric model is built. A cylinder closure weld is φ20000×50×92000 with a V-shaped groove and a total of 60 welds. The width of the primary heating band is 400 mm, the spacing between primary heating and auxiliary heating is 300 mm, the width of the auxiliary heating band is 300 mm, and the holding temperature of auxiliary heating is 300° C. Welding and heat treatment process analysis are performed for the cylinder closure weld by the numerical simulation method. The local heat treatment method with primary and auxiliary heating is adopted. Distributions of axial stress and circumferential stress of the path P1 near the weld on an inner wall of the cylinder closure weld are output as shown in the drawing. In FIG. 4(a), the ordinate represents the axial stress of the path P1 along the inner wall of the cylinder closure weld, and the abscissa represents that a distance from each side of the weld is 30 mm; in FIG. 4(b), the ordinate represents the circumferential stress of the path P1 along the inner wall of the cylinder closure weld, and the abscissa represents that a distance from each side of the weld is 30 mm. It can be seen from FIG. 4(a) and FIG. 4(b) that the local heat treatment method for controlling residual stress with primary and auxiliary heating in the present disclosure can significantly reduce the axial stress and the circumferential stress near the weld and change a tensile stress into a compressive stress. Compared with the traditional heat treatment method in which heating is performed only near the weld, the local heat treatment method for controlling residual stress with primary and auxiliary heating in the present disclosure can significantly reduce axial and circumferential stress values, achieving the optimal heat treatment effect.

Certainly, the foregoing descriptions are not intended to limit the present disclosure, and the present disclosure is also not limited to the above examples. Changes, modifications, additions or substitutions made by persons skilled in the art within the scope of essence of the present disclosure shall also be encompassed in the scope of protection of the present disclosure.

The invention claimed is:

1. A local heat treatment method for controlling residual stress with primary and auxiliary heating, wherein a primary heating band is applied to a weld and an auxiliary heating band is applied a certain distance from the primary heating band, and the method comprises the following steps:
   I. determination of a heat treatment process of the primary heating band
   at step 1, preliminarily determining the heat treatment process of the primary heating band, comprising
   determining key process parameters of heat treatment according to a heat treatment object in combination with respective inherent features and corresponding local heat treatment purposes as well as technical design documents and relevant standards and regulations, wherein the key process parameters comprise a temperature increase and decrease rate, a holding temperature, a holding time, and a width $W_{PHB}$ of the primary heating band;
   at step 2, optimizing the heat treatment process of the primary heating band, comprising
   determining whether a width of a uniform temperature band and temperature uniformity along a thickness direction satisfy requirements based on numerical simulation calculation, and performing verification through a heat treatment simulation test based on the determination to optimize the key process parameters of the primary heating band;
   II. determination of a heat treatment process of the auxiliary heating band, wherein
   heat treatment process parameters of the auxiliary heating band comprise a distance $W_{DCB}$ of a central position of the auxiliary heating band from the primary heating band, a highest temperature $T_A$ of the auxiliary heating band and a width $W_{AHB}$ of the auxiliary heating band;
   at step 3, determining the distance $W_{DCB}$ of the central position of the auxiliary heating band from the primary heating band, comprising
   building a finite element model to perform welding and heat treatment simulation based on a heat treatment process curve and the key process parameters determined at step 2, and checking a change result of axial stress or transverse stress during a heat treatment temperature holding process to determine a middle position where compressive stress is generated, and the middle position where compressive stress is generated is away from the center of the weld in the following distance: $W_{PHB} < W_{DCB} < 2W_{PHB}$, so that the distance $W_{DCB}$ of the central position of the auxiliary heating band from the primary heating band is obtained;
   at step 4, determining the highest temperature $T_A$ of the auxiliary heating band, comprising
   firstly, assuming that the width of the auxiliary heating band is the width of the primary heating band at the central position of the auxiliary heating band determined at step 3, and then comparing stress distributions after heat treatment at different holding temperatures to determine the highest temperature $T_A$ of the auxiliary heating band;
   at step 5, determining the width $W_{AHB}$ of the auxiliary heating band, comprising changing the width of the auxiliary heating band based on step 4 to determine the optimal width of the auxiliary heating band, wherein the width $W_{AHB}$ of the auxiliary heating band is $0.5W_{PHB} < W_{AHB} < W_{PHB}$;
   III. optimization of local heat treatment processes of primary heating and auxiliary heating
   at step 6, controlling the residual stress by the primary and auxiliary heating bands, comprising
   after the heat treatment processes of the primary and auxiliary heating bands are obtained, the impact of the temperature increase time of the auxiliary heating band is studied based on numerical simulation to determine a temperature increasing time of the auxiliary heating band, where the temperature of the auxiliary heating band increases after the temperature of the primary heating band increases;
   the specific local heat treatment method includes the following: firstly the primary heating band at a weld is heated to the holding temperature, the auxiliary heating band is heated when the primary heating band starts to cool down, and the auxiliary heating band starts to cool down when the primary heating band is cooled down to 100-150° C.

2. The local heat treatment method for controlling residual stress with primary and auxiliary heating according to claim 1, further comprising implementation of heat treatment, which specifically comprises,
   performing thermocouple spot-welding and laying of heating sheets and temperature holding tooling based on the determined heat treatment scheme, and wire-connecting a temperature measuring thermocouple, a temperature control thermocouple and a compensation thermocouple with a paperless recorder and a temperature control cabin to ensure that the thermocouples are and heat treatment-related equipment are fault-free, and then performing heat treatment.

3. The local heat treatment method for controlling residual stress with primary and auxiliary heating according to claim 1, wherein the primary heating band is applied to the weld to control a microstructure and hardness of the weld and uniformize the structure so as to realize micro-control of the residual stress; the auxiliary heating band is applied a certain distance from the weld to generate compressive stress on an inner surface of the weld so as to realize macro-control of the compressive stress.

4. The local heat treatment method for controlling residual stress with primary and auxiliary heating according to claim 1, wherein the heat treatment object is a large-size reinforcement plate weld, a pipe circumferential weld, a cylinder closure weld, or a flat plate structure on a pressure vessel.

5. The local heat treatment method for controlling residual stress with primary and auxiliary heating according to claim 4, wherein a diameter of an opening on the pressure vessel of the reinforcement plate is greater than or equal to 4 m.

6. The local heat treatment method for controlling residual stress with primary and auxiliary heating according to claim 4, wherein the reinforcement plate is a circular reinforcement plate or a square reinforcement plate; for the circular reinforcement plate, six-segment three-stage symmetrical heat treatment is adopted; for the square reinforcement plate, four-segment two-stage symmetrical heat treatment is adopted.

7. The local heat treatment method for controlling residual stress with primary and auxiliary heating according to claim 4, wherein when a radius-thickness ratio of the closure weld is greater than 500, segmented symmetrical heat treatment is adopted as follows: a whole circumference is divided into several symmetrical segments to perform symmetrical heat treatment.

8. The local heat treatment method for controlling residual stress with primary and auxiliary heating according to claim 1, wherein when the primary heating band adopts induction heating, determination of arrangement of an induction cable based on numerical simulation is further comprised in step 2.

9. The local heat treatment method for controlling residual stress with primary and auxiliary heating according to claim 1, wherein the highest temperature of the auxiliary heating band is 40-60% of the heat treatment holding temperature of the primary heating band in step 4.

* * * * *